United States Patent
Kiuchi et al.

(10) Patent No.: US 11,127,516 B2
(45) Date of Patent: Sep. 21, 2021

(54) GROMMET AND WIRE HARNESS

(71) Applicant: Yazaki Corporation, Tokyo (JP)

(72) Inventors: Masaru Kiuchi, Shizuoka (JP);
Hirotaka Kiyota, Shizuoka (JP);
Takeshi Onoda, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/773,948

(22) Filed: Jan. 27, 2020

(65) Prior Publication Data
US 2020/0279673 A1 Sep. 3, 2020

(30) Foreign Application Priority Data
Feb. 28, 2019 (JP) .............................. JP2019-035042

(51) Int. Cl.
*H01B 17/58* (2006.01)
*H02G 3/04* (2006.01)

(52) U.S. Cl.
CPC ......... *H01B 17/583* (2013.01); *H02G 3/0462* (2013.01)

(58) Field of Classification Search
CPC . B60R 16/0222; H01B 17/583; H02G 3/0462
See application file for complete search history.

(56) References Cited

U.S. PATENT DOCUMENTS

| | | | |
|---|---|---|---|
| 2001/0008330 A1* | 7/2001 | Sakata | B60R 16/0222 277/316 |
| 2002/0038492 A1* | 4/2002 | Hashimoto | F16L 5/10 16/2.1 |
| 2009/0028659 A1* | 1/2009 | Shibuya | F16B 21/073 411/57.1 |
| 2016/0134090 A1* | 5/2016 | Kushima | H02G 3/0481 174/362 |
| 2017/0349123 A1* | 12/2017 | Katoh | B60R 16/0222 |

FOREIGN PATENT DOCUMENTS

| | | |
|---|---|---|
| JP | H09-123847 A | 5/1997 |
| JP | 10-80042 A | 3/1998 |
| JP | 10-172371 A | 6/1998 |
| JP | 11-346422 A | 12/1999 |
| JP | 2008-2498 A | 1/2008 |
| JP | 2013-162553 A | 8/2013 |

* cited by examiner

*Primary Examiner* — William H. Mayo, III
*Assistant Examiner* — Rhadames Alonzo Miller
(74) *Attorney, Agent, or Firm* — Kenealy Vaidya LLP

(57) ABSTRACT

A grommet includes a main body part fitted to a penetration hole penetrating an attachment panel, and a tubular part unified with the main body part so as to have a tubular shape. The tubular part includes a tubular part main body formed continuing from the main body part, and a fold-back part formed continuing from the tubular part main body on a side opposite to a side where the main body part is positioned in the axial direction and that can be folded back to the outside of the tubular part main body. The fold-back part is foldable between an attachment position where the fold-back part is folded back to the outside of the tubular part main body, and a use position where the fold-back part is positioned on the side opposite to the side where the main body part is positioned.

4 Claims, 9 Drawing Sheets

GROMMET AND WIRE HARNESS

CROSS-REFERENCE TO RELATED APPLICATION(S)

The present application claims priority to and incorporates by reference the entire contents of Japanese Patent Application No. 2019-035042 filed in Japan on Feb. 28, 2019.

BACKGROUND OF THE INVENTION

1. Field of the Invention

The present invention relates to a grommet and a wire harness.

2. Description of the Related Art

One example of the conventionally known grommets to be mounted in a vehicle is disclosed in Japanese Patent Application Laid-open No. 2008-2498. This grommet is provided to a through-hole that is open through a panel member. In this through-hole, a leading member such as a wire harness or a washer hose is inserted. This grommet is formed of an elastic member combining a fixing part and a holding part, and includes a fold-back part. The fixing part is fixed to the through-hole of the panel member. The holding part includes an insertion hole where the leading member that is led out through the through-hole is inserted and holds the leading member. The fold-back part is extended in a tubular shape from one end of the holding part along the direction where the leading member is inserted. As the fold-back part is folded back toward the holding part while the leading member is inserted in the insertion hole, the fold-back part presses the holding part to the leading member.

Here, the grommet is disposed for the purpose of stopping water from one space side to the other space side, the spaces being sectioned by a panel member. In order to efficiently stop water, it is necessary to extend the part that covers the leading member. However, if the part that covers the leading member is extended long, it becomes difficult to pass the leading member through the grommet and the workability in assembling the leading member such as a wire harness or a washer hose may deteriorate.

SUMMARY OF THE INVENTION

The present invention has been made in view of the above circumstance, and an object is to provide a grommet and a wire harness that can improve the water stopping performance while suppressing the deterioration in workability in assembling the grommet.

In order to solve the above mentioned problem and achieve the object, a grommet according to one aspect of the present invention includes a main body part that is fitted to a penetration hole penetrating an attachment target along an axial direction, stops water at the penetration hole, and has a wiring material inserted thereinto along the axial direction; and a tubular part that is unified with the main body part so as to have a tubular shape, and has the wiring material inserted thereinto along the axial direction, wherein the tubular part includes: a tubular part main body that is formed continuing from the main body part; and a fold-back part that is formed continuing from the tubular part main body on a side opposite to a side where the main body part is positioned in the axial direction, and the fold-back part is foldable between an attachment position where the fold-back part is folded back to outside of the tubular part main body, and a use position where the fold-back part is positioned on the side opposite to the side where the main body part is positioned with respect to the tubular part main body.

According to another aspect of the present invention, in the grommet, it is preferable that at the use position, an entire length of an inner surface of the fold-back part in a circumferential direction is longer than an entire length of an inner surface of the tubular part main body in the circumferential direction, and in a state where the fold-back part is folded back toward the tubular part main body, the fold-back part is disposed outside the tubular part main body in a radial direction without causing a contracting force in the radial direction.

According to still another aspect of the present invention, in the grommet, it is preferable that at the use position, a diameter of the inner surface of the fold-back part is larger than a diameter of the inner surface of the tubular part main body and a step part is provided between the fold-back part and the tubular part main body.

According to still another aspect of the present invention, in the grommet, it is preferable that the fold-back part includes a folding part that opens to the circumferential direction at the attachment position and that is folded to the circumferential direction at the use position.

In order to solve the above mentioned problem and achieve the object, a wire harness according to still another aspect of the present invention includes a wiring material having conductivity; and a grommet provided to the wiring material, wherein the grommet includes: a main body part that is fitted to a penetration hole penetrating an attachment target along an axial direction, stops water at the penetration hole, and has the wiring material inserted thereinto along the axial direction; and a tubular part that is unified with the main body part so as to have a tubular shape, and has the wiring material inserted thereinto along the axial direction, the tubular part includes: a tubular part main body that is formed continuing from the main body part; and a fold-back part that is formed continuing from the tubular part main body on a side opposite to a side where the main body part is positioned in the axial direction, and the fold-back part is foldable between an attachment position where the fold-back part is folded back to outside of the tubular part main body, and a use position where the fold-back part is positioned on the side opposite to the side where the main body part is positioned with respect to the tubular part main body.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments of the present invention are hereinafter described in detail with reference to the drawings. Note that the present invention is not limited by these embodiments. The components to be described in the embodiments below include the component that can be replaced easily by a person skilled in the art or that is substantially the same.

First Embodiment

Figure 1:
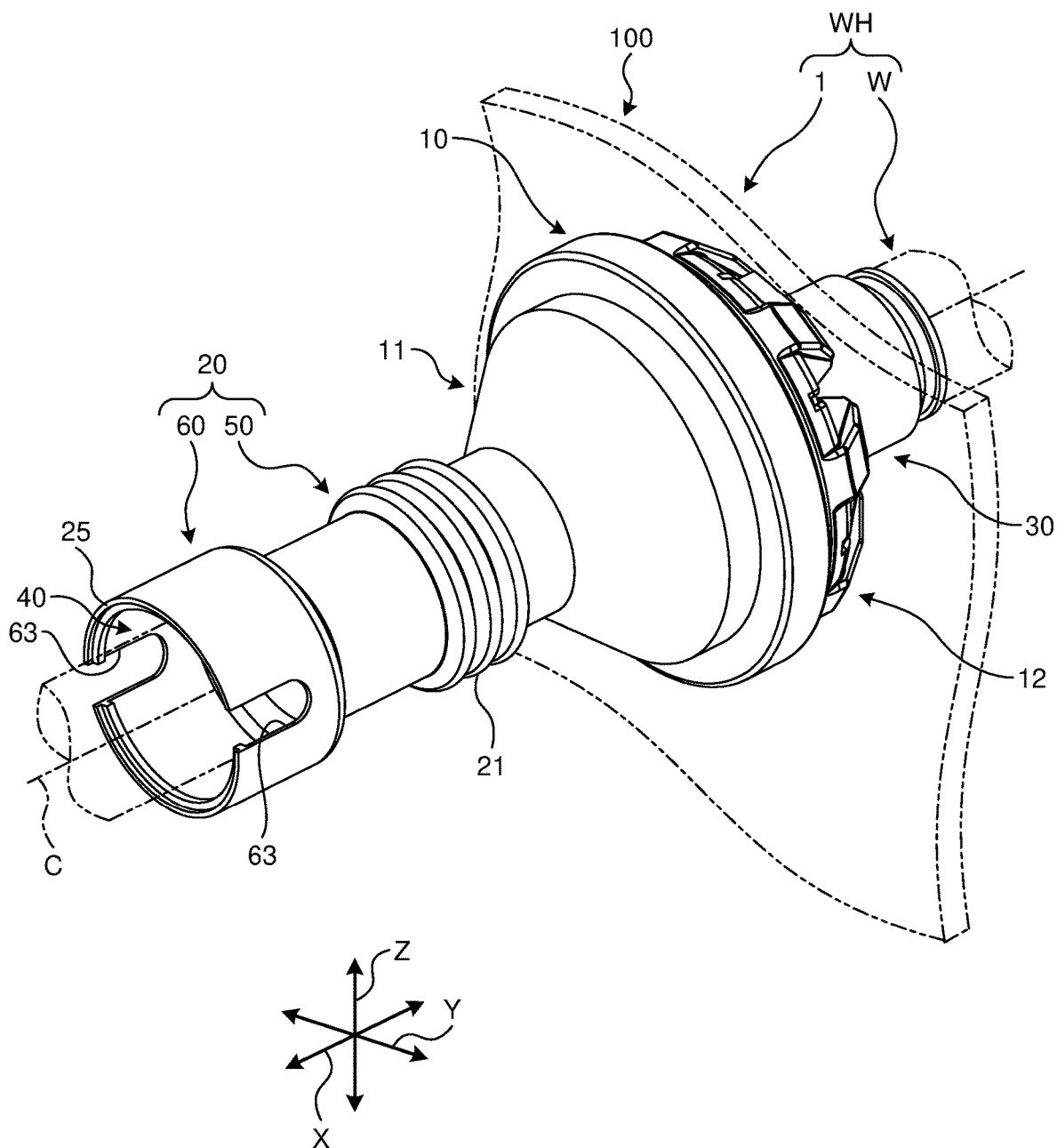
FIG. 1 is a perspective view illustrating a schematic structure of a wire harness in which a grommet according to a first embodiment is used.
Figure 2:
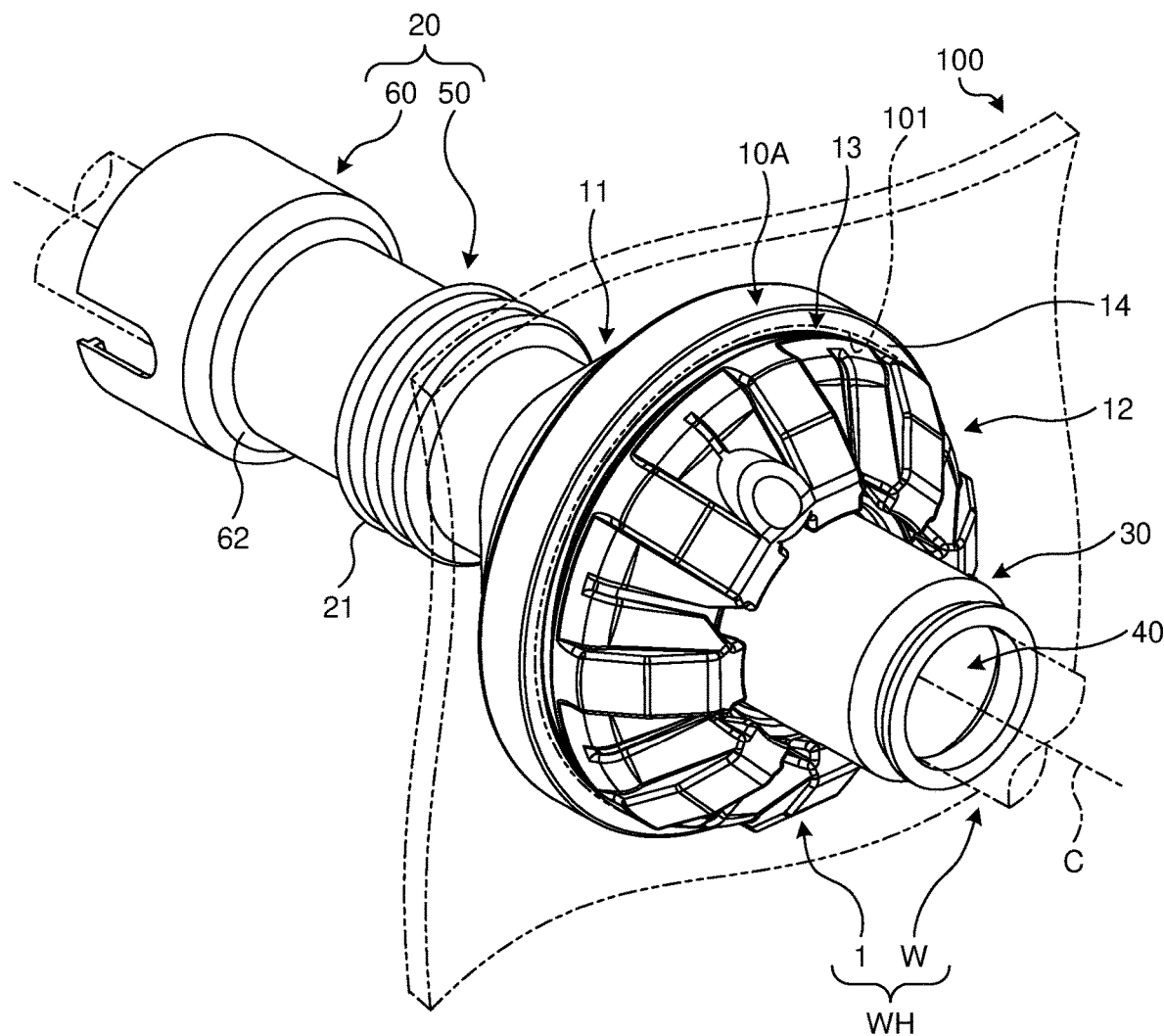
FIG. 2 is a perspective view illustrating the schematic structure of the wire harness in which the grommet according to the first embodiment is used.
Figure 3:
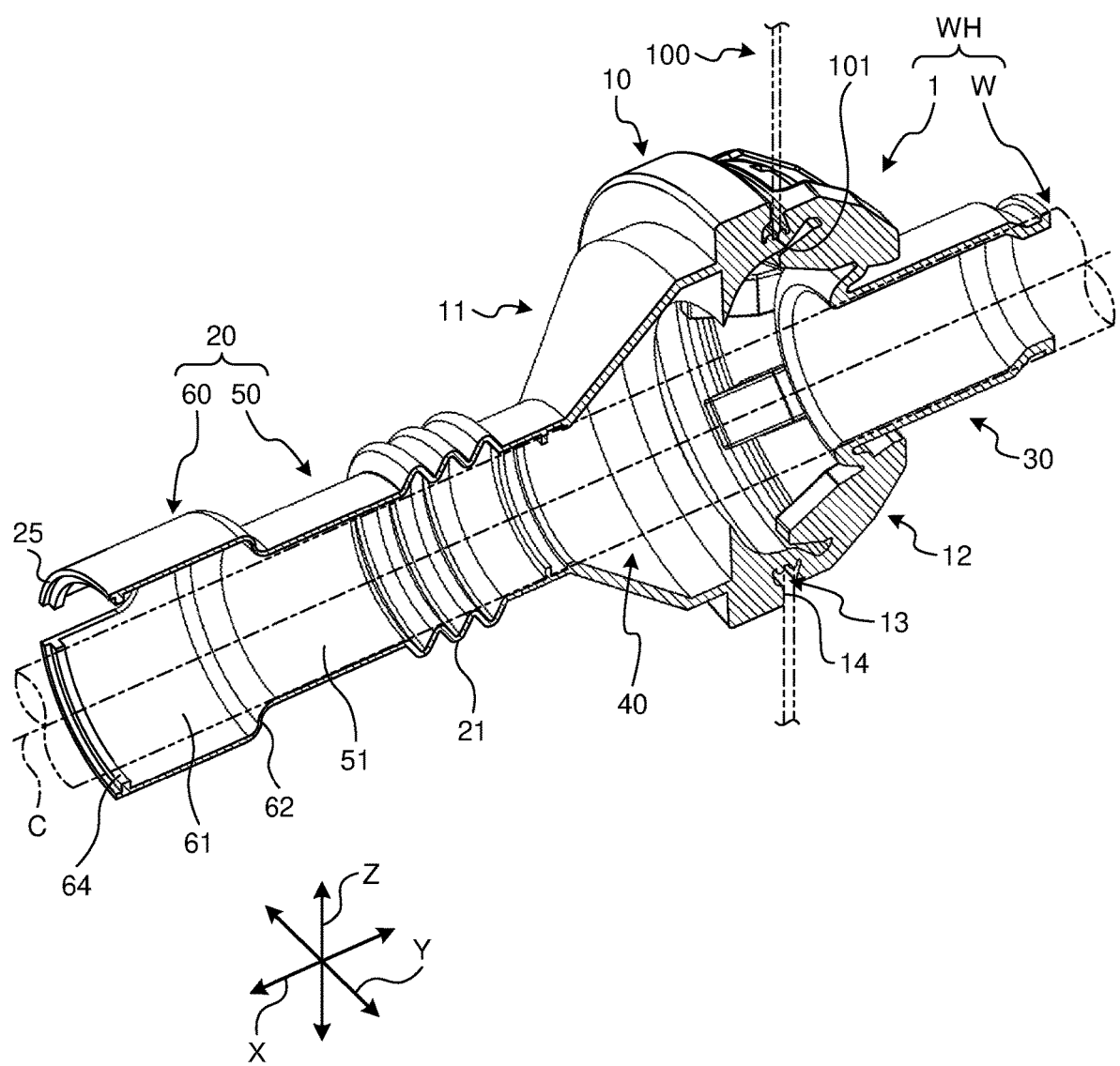
FIG. 3 is a cross-sectional perspective view illustrating the schematic structure of the wire harness in which the grommet according to the first embodiment is used.

A grommet 1 according to a first embodiment that is illustrated in FIG. 1, FIG. 2, and FIG. 3 is incorporated in a wire harness WH that is wired in a vehicle or the like. The wire harness WH is formed in a manner that, for example, a plurality of wiring materials W used in the connection between devices to be mounted in the vehicle for power supply or signal communication are bundled into an assembly, and the wiring materials W are connected to each device with a connector or the like. The wire harness WH includes the wiring material W that is conductive and the grommet 1 that is provided to the wiring material W and has the wiring material W inserted thereinto. The wire harness WH may further include various components, for example, an exterior member such as a corrugate tube, a resin tape, or a protector, an electrical connection box, and a fixing tool. The wiring material W is formed of, for example a metal bar, an electric wire, an electric wire bundle, or the like. The metal bar is a conductive bar-like member externally covered with an insulating covering part. The electric wire is a conductor (core wire) formed of a plurality of conductive metal strands that is externally covered with an insulating covering part. The electric wire bundle is a bundle of the electric wires. The wire harness WH bundles and unifies the wiring materials W and electrically connects between the devices through connectors or the like provided at terminals of the bundled wiring materials W.

When the wiring material W is wired across two spaces that are sectioned with an attachment panel 100, which corresponds to an attachment target, as a border through a penetration hole 101 provided to the attachment panel 100, the grommet 1 is used in the penetration hole 101. The attachment panel 100 is, for example, a metal plate that forms a body of the vehicle, and the penetration hole 101 penetrates the attachment panel 100 along a plate thickness direction. The two spaces that are sectioned with the attachment panel 100 as the border are typically a space in the vehicle (for example, cabin) and a space outside the vehicle (for example, engine compartment). The grommet 1 is assembled to the penetration hole 101 in a state where the wiring material W of the wire harness WH is inserted into the grommet 1 and the grommet 1 is externally attached to the wiring material W; thus, the grommet 1 protects the wiring material W that passes the penetration hole 101 and stops water (is waterproof) at the penetration hole 101. The grommet 1 also has functions of preventing dust and blocking noise in addition to the waterproof function for the penetration hole 101, for example. The structure of the grommet 1 is described in detail with reference to each drawing.

Note that the attachment panel 100 is roughly drawn with a two-dot chain line in FIG. 1, FIG. 2, and FIG. 3, and not drawn in the other drawings. In addition, in each drawing, the wiring material W and the attachment panel 100 are each drawn roughly with a two-dot chain line. Among a first direction, a second direction, and a third direction that are orthogonal to each other in the description below, the first direction is referred to as "axial direction X", the second direction is referred to as "width direction Y", and the third direction is referred to as "height direction Z". The axial direction X, the width direction Y, and the height direction Z are typically orthogonal to each other. Here, the axial direction X corresponds to the plate thickness direction of the attachment panel 100 described above, and also corresponds to the direction where the wiring material W and the grommet 1 are inserted into the penetration hole 101. In other words, the axial direction X is the direction along the direction where the wiring material W inserted into the grommet 1 is extended, and the penetration hole 101 of the attachment panel 100 penetrates the attachment panel 100 along the axial direction X. The width direction Y and the height direction Z correspond to the direction where the attachment panel 100 is extended. In the description here, the wiring material W is wired linearly along the axial direction X for the convenience in order to help understanding; however, the structure is not limited thereto. In another example, in a state where the grommet 1 is attached to the attachment panel 100, the axial direction X may be a bent direction and the grommet 1 and the wiring material W may be bent partially. The directions to be described below correspond to the directions in the state where the grommet 1 is assembled to the attachment panel 100 unless otherwise stated.

Specifically, the grommet 1 according to the first embodiment is a sealing member that has the wiring material W inserted inside along the axial direction X and can stop water at the penetration hole 101 in the attachment panel 100 as illustrated in FIG. 1, FIG. 2, and FIG. 3. The grommet 1 includes a main body part 10, a tubular part 20, and a tubular part 30, and is formed as an elastic body in which these parts are unified. The grommet 1 is formed of, for example, an insulating elastic resin material that has low rigidity and high flexibility, such as rubber or thermoplastic elastomer (for example, ethylene-propylene-diene rubber (EPDM)).

The main body part 10 is a part that is fitted to the penetration hole 101, stops water at the penetration hole 101, and has the wiring material W inserted thereinto along the axial direction X. The main body part 10 includes a first expansion part 11, a second expansion part 12, a fitting groove part 13, and a lip part 14.

The first expansion part 11 and the second expansion part 12 are each formed to have an annular shape, here a tubular shape, with a central axial line C thereof extended along the axial direction X. The first expansion part 11 and the second expansion part 12 face each other with a space therebetween along the axial direction X and are unified at an outer peripheral part 10A. Here, the outer peripheral part 10A is a part that connects to both the first expansion part 11 and the second expansion part 12 at a position near each outer end in a radial direction (direction orthogonal to the central axial line C).

The first expansion part 11 and the second expansion part 12 are each formed to have a shape that expands outward along the axial direction X. The first expansion part 11 and the second expansion part 12 are each formed to have a hollow dome shape as a whole while being unified at the outer peripheral part 10A. The first expansion part 11 is connected to the tubular part 20 on a surface of the first expansion part 11 that is opposite to a surface thereof on the second expansion part 12 side in the axial direction X. The second expansion part 12 is connected to the tubular part 30 on a surface of the second expansion part 12 that is opposite to a surface thereof on the first expansion part 11 side in the axial direction X.

The fitting groove part 13 is a groove that is provided to the outer peripheral part 10A where the first expansion part 11 and the second expansion part 12 are unified. The fitting groove part 13 is formed in the outer peripheral part 10A as an annular groove part with the central axial line C as a center. With the main body part 10 fitted to the penetration hole 101, an end part of the attachment panel 100 that forms the penetration hole 101 is fitted to the fitting groove part 13.

The lip part 14 is a water stopping part with a pleated shape that is formed along the fitting groove part 13. Here, the lip part 14 is formed to have an annular shape along the fitting groove part 13 at an end part of the fitting groove part 13 on the first expansion part 11 side. That is to say, the lip part 14 is provided to the fitting groove part 13 and has an annular shape with the central axial line C as the center. While the end part of the penetration hole 101 is fitted to the fitting groove part 13, the lip part 14 is in contact with the surface of the end part (here, the surface on the first expansion part 11 side) and stops water at the surface. The lip part 14 is in close contact with the surface of the end part that forms the penetration hole 101 by the elastic deformation, and seals the entire periphery of the penetration hole 101.

The tubular parts 20 and 30 are the parts that are unified with the main body part 10, are formed to have the tubular shape, and have the wiring material W inserted thereinto along the axial direction X.

The tubular part 20 is formed to protrude from the first expansion part 11 to one side (opposite to the second expansion part 12 side) along the axial direction X. The tubular part 20 is formed to have a cylindrical shape with the central axial line C as the center and is extended along the axial direction X. The tubular part 20 is formed to have a cylindrical shape with the diameter smaller than that of a large part of the first expansion part 11. The tubular part 20 has one end part in the axial direction X open and the other end connected to the first expansion part 11. The tubular part 20 is connected at an approximately central position of the first expansion part 11 with respect to the width direction Y and the height direction Z. The tubular part 20 includes a bellows part 21. The bellows part 21 is formed in a manner that a part of the tubular part 20 in the axial direction X is formed in the bellows shape. That is to say, the bellows part 21 is formed in a manner that a part of the tubular part 20 in the axial direction X alternately becomes a large-diameter part and a small-diameter part toward one direction of the axial direction X. By having the bellows part 21, the tubular part 20 can bend easily at the position of the bellows part 21. Note that the structure of this tubular part 20 is described in detail below.

The tubular part 30 is formed to protrude from the second expansion part 12 to one side (opposite to the first expansion part 11 side) along the axial direction X. The tubular part 30 is formed to have a cylindrical shape with the central axial line C as the center and is extended along the axial direction X. The tubular part 30 is formed to have a cylindrical shape with the diameter smaller than that of a large part of the second expansion part 12. The tubular part 30 has one end part in the axial direction X open and the other end connected to the second expansion part 12. The tubular part 30 is connected at an approximately central position of the second expansion part 12 with respect to the width direction Y and the height direction Z.

In the grommet 1 with the above structure, an internal space part formed by the main body part 10, the tubular part 20, and the tubular part 30 functions as an insertion space part 40. The insertion space part 40 is a space part where the wiring material W is inserted, and continues along the tubular part 20, the main body part 10, and the tubular part 30 along the axial direction X. In the grommet 1, the wiring material W is inserted along the axial direction X into the insertion space part 40 that is formed to communicate with the tubular part 20, the main body part 10, and the tubular part 30.

The grommet 1 is attached to the wiring material W in a manner that the wiring material W is inserted into the insertion space part 40, and then, together with the terminal of the wiring material W, the tubular part 20 or the tubular part 30 is inserted into the penetration hole 101. Then, as the main body part 10 is fitted to the penetration hole 101 so that the end part of the penetration hole 101 is fitted to the fitting groove part 13 of the main body part 10, the grommet 1 is assembled to the attachment panel 100. When the grommet 1 is in this state, the lip part 14 is in close contact with the surface of the periphery of the penetration hole 101 while the lip part 14 is elastically deformed, and thus, the entire periphery of the penetration hole 101 is sealed. The grommet 1 may stop water at the opening of the tubular parts 20 and 30 in a manner that a winding tape or the like is wound along the wiring material W inserted into the insertion space part 40, the tubular parts 20 and 30, and the wiring material W.

Next, the tubular part 20 is described in detail. The tubular part 20 includes a tubular part main body 50 and a fold-back part 60. The tubular part main body 50 is a part of the tubular part 20 that is connected to the main body part 10 and formed continuing from the main body part 10, and the bellows part 21 is provided to the tubular part main body 50.

Figure 4:
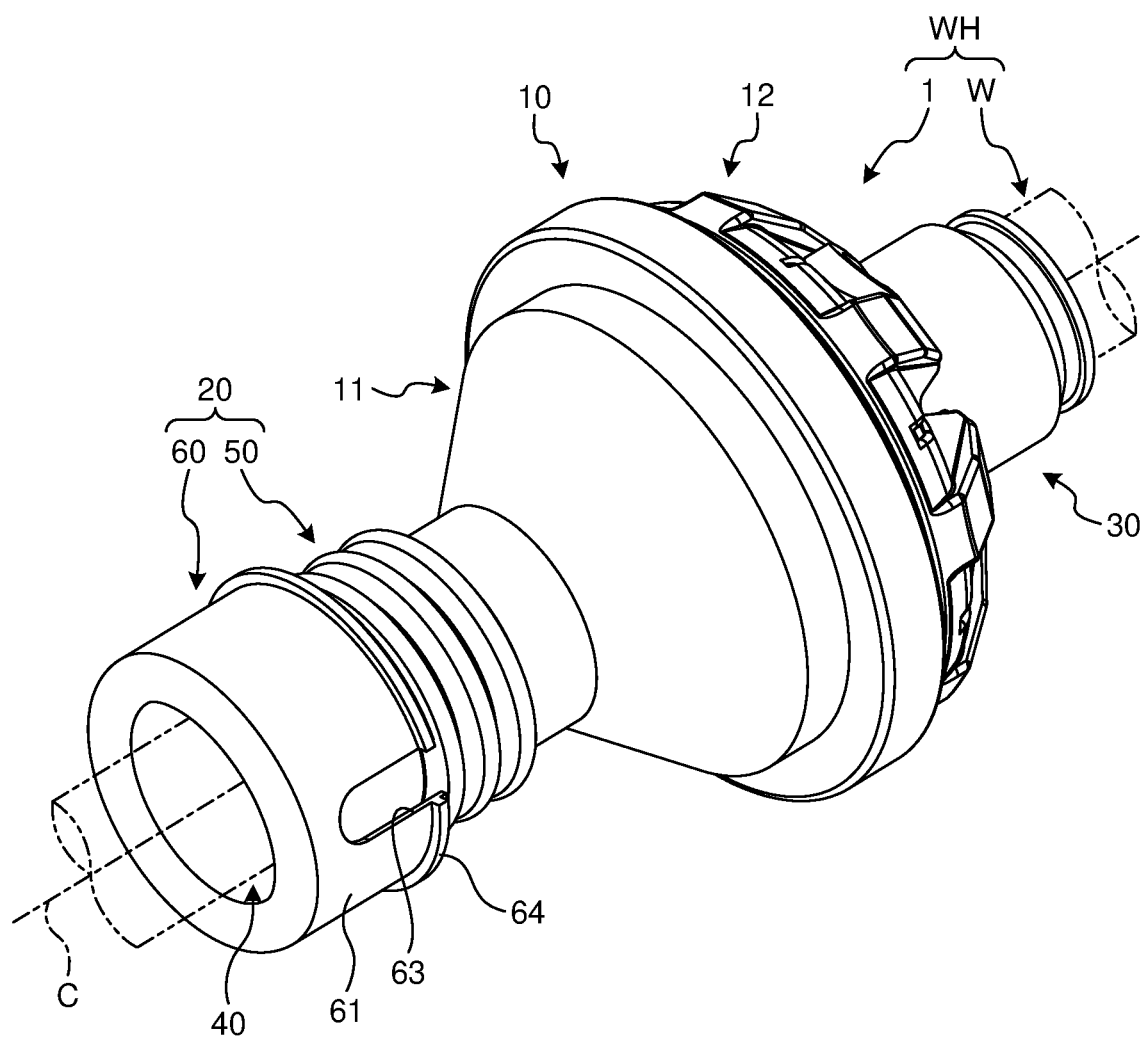
FIG. 4 is a perspective view illustrating a state in which a fold-back part of the grommet illustrated in FIG. 1 is folded back.
Figure 5:
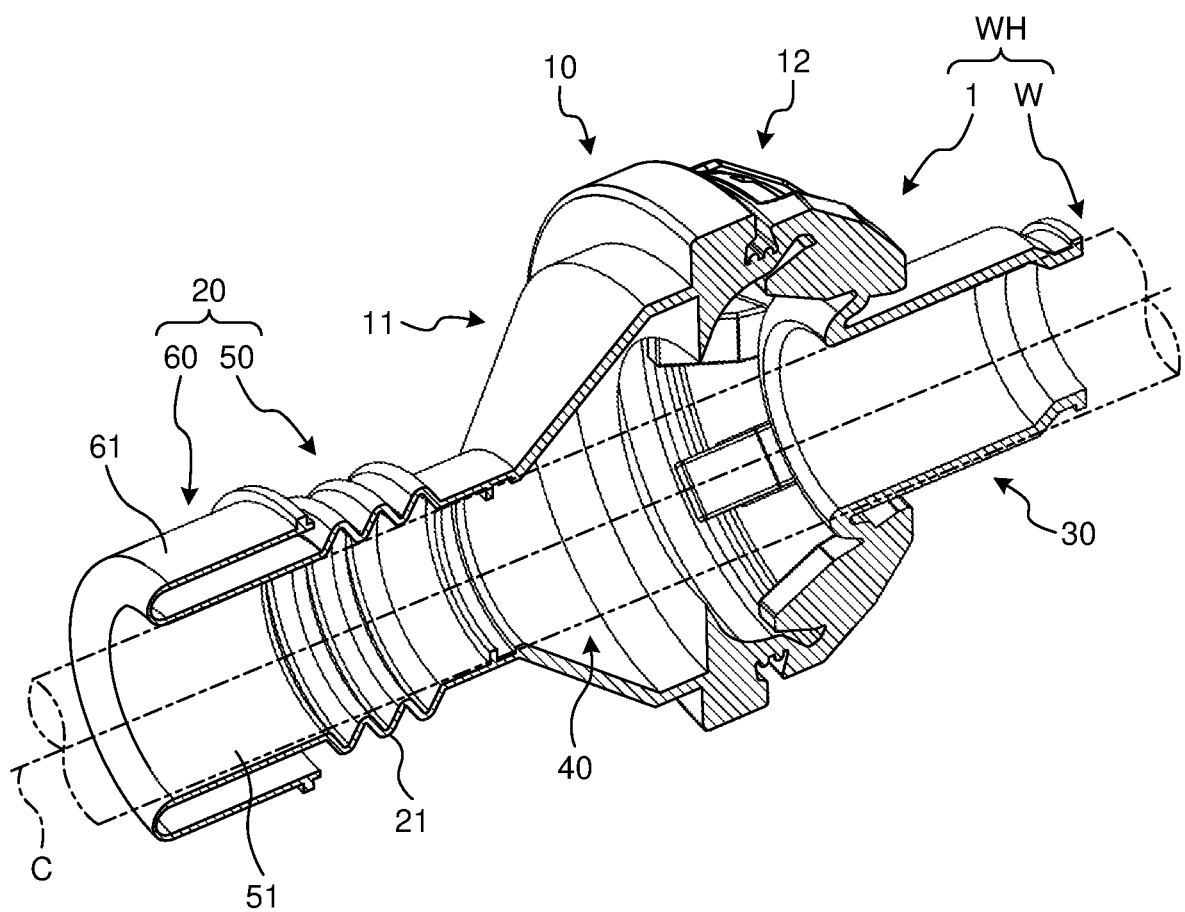
FIG. 5 is a cross-sectional view of the grommet illustrated in FIG. 4.
Figure 5:
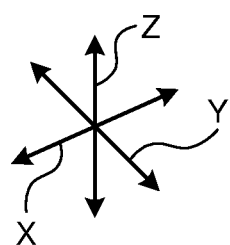

The fold-back part 60 is formed continuing from the tubular part main body 50 on the side opposite to the side where the main body part 10 is positioned in the axial direction X, and moreover, is foldable to the outside of the tubular part main body 50 in the radial direction as illustrated in FIG. 4 and FIG. 5 to be described below. The fold-back part 60, which has been folded to the outside of the tubular part main body 50, is at an attachment position corresponding to a position when the grommet 1 is attached to the wiring material W. On the other hand, as illustrated in FIG. 1, FIG. 2, and FIG. 3, when the fold-back part 60 is at the position on the side opposite to the side where the main body part 10 is disposed with respect to the tubular part main body 50, this position corresponds to a use position when the wire harness WH with the grommet 1 attached to the wiring material W is used. The fold-back part 60 is foldable between the attachment position and the use position described above. The grommet 1 according to the first embodiment is typically molded integrally at the positional relation where the parts are at the respective attachment positions, and is foldable between the attachment position and the use position.

At the use position, the diameter of the fold-back part 60 with the central axial line C as the center is larger than the diameter of the tubular part main body 50 with the central axial line C as the center. Thus, the fold-back part 60 includes a step part 62 between the fold-back part 60 and the tubular part main body 50.

That is to say, the diameter of the tubular part 20 varies in the axial direction X with the step part 62 as the border, and the part on the side opposite to the side where the main body part 10 is positioned with respect to the step part 62 has a larger diameter than the part on the side where the main body part 10 is positioned. In this manner, regarding the tubular part 20 whose diameter varies with the step part 62 as the border, the part on the side opposite to the side where the main body part 10 is positioned with respect to the step part 62 serves as the fold-back part 60 and the part on the side where the main body part 10 is positioned with respect to the step part 62 serves as the tubular part main body 50.

In addition, since the diameter of the fold-back part 60 with the central axial line C as the center is larger than the diameter of the tubular part main body 50 with the central axial line C as the center, the diameter of an inner surface 61 of the fold-back part 60 is also larger than the diameter of an inner surface 51 of the tubular part main body 50. Therefore, the entire length of the inner surface 61 of the fold-back part 60 at the use position in the circumferential direction, that is, the entire length of the inner surface 61 in the circumferential direction with the central axial line C as the center is longer than the entire length of the inner surface 51 of the tubular part main body 50 in the circumferential direction. In addition, the length of the fold-back part 60 in the axial direction X is approximately equal to the length of the tubular part main body 50 from the step part 62 to the position of the bellows part 21, or is shorter than the length of the tubular part main body 50 from the step part 62 to the position of the bellows part 21.

Moreover, the fold-back part 60 includes cut parts 63. The cut part 63 is a part that is cut along the axial direction X and has a predetermined width in the circumferential direction with the central axial line C as the center from an opening end part 25 positioned on the side opposite to the side where the tubular part 20 is connected to the main body part 10. The cut parts 63 are provided to the fold-back part 60 at two positions that are point symmetrical about the central axial line C. In addition, near the opening end part 25 on the inner surface 61 of the fold-back part 60, a rib 64 is formed. The rib 64 protrudes from the inner surface 61 and is extended to the circumferential direction with the central axial line C as the center. The rib 64 is elastically deformed to be in close contact with an outer surface of the wiring material W in a state where the wiring material W is inserted into the tubular part 20 and a winding tape or the like is wound, and thus, the rib 64 functions as a lip part that seals the entire circumference of the wiring material W.

The entire length of the inner surface 61 of the fold-back part 60 described above in the circumferential direction corresponds to the entire length when it is assumed that the fold-back part 60 is free of any cut part 63 and the member that forms the fold-back part 60 is also disposed at the position of the cut part 63. The entire length of the inner surface 61 of the fold-back part 60 described above in the circumferential direction corresponds to the entire length of the parts except the rib 64.

The wiring material W is inserted into the grommet 1 with such a structure, in the state in which the fold-back part 60 is folded back. FIG. 4 is a perspective view in which the fold-back part 60 of the grommet 1 illustrated in FIG. 1 is folded back. FIG. 5 is a cross-sectional view of the grommet 1 illustrated in FIG. 4. When the fold-back part 60 is folded back, the tubular part main body 50 is folded from the position of the step part 62 to the position of the tubular part main body 50. Specifically, the fold-back part 60 is folded back so that the opening end part 25 comes closer to the main body part 10 over the step part 62 and the tubular part main body 50 is covered from the outside of the tubular part main body 50 in the radial direction with the central axial line C as the center. Thus, the fold-back part 60 is folded back to the outside of the tubular part main body 50 in the radial direction with the central axial line C as the center so that the inner surface 61 becomes the outer surface. In addition, since the length of the fold-back part 60 in the axial direction X is approximately equal to the length of the tubular part main body 50 from the step part 62 to the position of the bellows part 21, the fold-back part 60 covers the range substantially from the step part 62 to the bellows part 21 in the tubular part main body 50 from the outside. The grommet 1 becomes shorter in the axial direction X when the fold-back part 60 is folded back toward the tubular part main body 50 than when the fold-back part 60 is not folded back.

In this case, the entire length of the inner surface 61 of the fold-back part 60 in the circumferential direction is longer than the entire length of the inner surface 51 of the tubular part main body 50 in the circumferential direction; therefore, in the state at the attachment position where the fold-back part 60 is folded back toward the tubular part main body 50, the fold-back part 60 can be disposed outside the tubular part main body 50 in the radial direction without causing a contracting force in the radial direction. As a result, the fold-back part 60 can cover the tubular part main body 50 from the outside and can be disposed outside the tubular part main body 50 easily. In the first embodiment, when the grommet 1 is molded in the producing process, the grommet 1 is molded in the state at the attachment position where the fold-back part 60 has been folded back toward the tubular part main body 50.

When the wiring material W is inserted into the grommet 1, the wiring material W is inserted in the state at the attachment position where the fold-back part 60 has been folded in this manner. Before the wiring material W is inserted into the grommet 1, a tool (not shown) that can increase the size of the insertion space part 40 is inserted into the insertion space part 40. After the size of the insertion space part 40 in a predetermined direction that intersects the axial direction X is increased, the wiring material W is inserted. In this case, the entire length of the grommet 1 in the axial direction X is short because the fold-back part 60 is folded back. Thus, the tool can be inserted easily and with the use of this tool, the size of the insertion space part 40 in the predetermined direction can be increased easily. The wiring material W is inserted into the insertion space part 40 after the size of the insertion space part 40 of the grommet 1 is increased by the tool.

Note that, in fact, the grommet 1 according to the first embodiment is molded integrally at the positional relation where the parts are at the respective attachment positions as described above; therefore, in the molded state, the foldback part 60 is at the attachment position. Thus, the grommet 1 according to the first embodiment enables the work of inserting the wiring material W easily while the grommet 1 is at the attachment position without requiring the folding process as described above.

After the wiring material W is inserted into the insertion space part 40 of the grommet 1, the fold-back part 60 that is folded back to the outside of the tubular part main body 50 is folded from the step part 62 to the use position where the fold-back part 60 is on the side opposite to the side where the main body part 10 is positioned in the axial direction X (see FIG. 1, FIG. 2, and FIG. 3). Thus, the grommet 1 becomes longer in the axial direction X; accordingly, the wiring material W can be covered with the large length and the wiring material W can be covered more widely with the grommet 1. After the grommet 1 in the state at the use position covers the wiring material W, an adhesive tape is wound around the fold-back part 60 continuously from the outside of the tubular part 20 and the wiring material W. Thus, the tubular part 20 and the wiring material W are unified.

In the grommet 1 and the wire harness WH according to the first embodiment described above, the fold-back part 60 of the grommet 1 is used while the fold-back part 60 is at the use position that is opposite to the side where the main body part 10 is positioned. Therefore, when the grommet 1 and the wire harness WH are used, the tubular part 20 through which the wiring material W is inserted covers the wiring material W while the tubular part 20 is long in the axial direction X. Thus, the grommet 1 makes it difficult for water to enter the insertion space part 40 more certainly and the water stopping performance can be enhanced.

When the grommet 1 is attached to the wiring material W, the fold-back part 60 is folded and brought to the attachment position. In this case, since the length of the tubular part 20 is short in the axial direction X, the grommet 1 is easily attached. Thus, the workability in attaching the grommet 1 can be improved. As a result, the water stopping performance can be enhanced while the deterioration in workability in assembling the grommet 1 is suppressed.

In addition, the entire length of the inner surface 61 in the circumferential direction while the fold-back part 60 is at the use position is longer than the entire length of the inner surface 51 of the tubular part main body 50 in the circumferential direction. Thus, in the state where the fold-back part 60 is folded back toward the tubular part main body 50, the fold-back part 60 can be positioned outside the tubular part main body 50 in the radial direction without causing the contracting force in the radial direction. Therefore, when the wiring material W is inserted into the tubular part 20 with the fold-back part 60 set to the attachment position, the wiring material W can be inserted more certainly and easily. As a result, the workability in assembling the grommet 1 can be improved more certainly.

In addition, when the fold-back part 60 is at the use position, the diameter of the inner surface 61 is larger than that of the inner surface 51 of the tubular part main body 50 and the step part 62 is provided between the fold-back part 60 and the tubular part main body 50; therefore, the entire length of the inner surface 61 of the fold-back part 60 in the circumferential direction can be made longer than the entire length of the inner surface 51 of the tubular part main body 50 in the circumferential direction more certainly. Thus, in the state at the attachment position where the fold-back part 60 is folded toward the tubular part main body 50, the fold-back part 60 can be positioned outside the tubular part main body 50 in the radial direction without causing the contracting force in the radial direction more certainly. As a result, the workability in assembling the grommet 1 can be improved more certainly.

Note that the grommet 1 may be formed so that the step part 62 is thinner than the tubular part main body 50 and the fold-back part 60. In this case, in the grommet 1, the step part 62 functions as a hinge part that connects the tubular part main body 50 and the fold-back part 60 so that folding is possible, and thus, the work of folding the fold-back part 60 toward the tubular part main body 50 can be facilitated.

Second Embodiment

The grommet 1 according to a second embodiment has a structure similar to that of the grommet 1 according to the first embodiment except that the fold-back part 60 includes folding parts 65. Since the other structure is similar to that of the first embodiment, the description of the similar structure is omitted and the same component is denoted by the same reference symbol.

Figure 6:
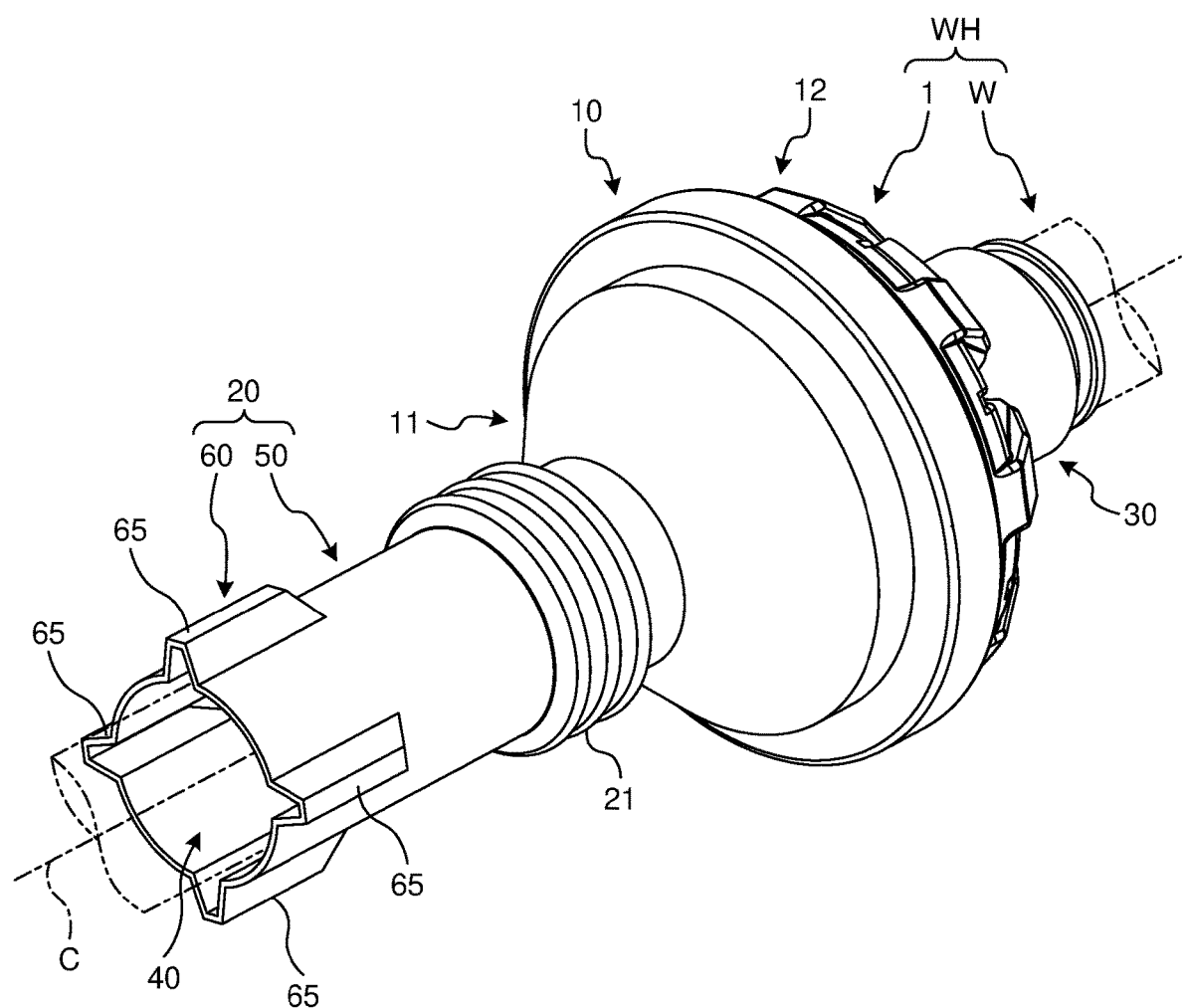
FIG. 6 is a perspective view illustrating a schematic structure of a wire harness in which a grommet according to a second embodiment is used.
Figure 7:
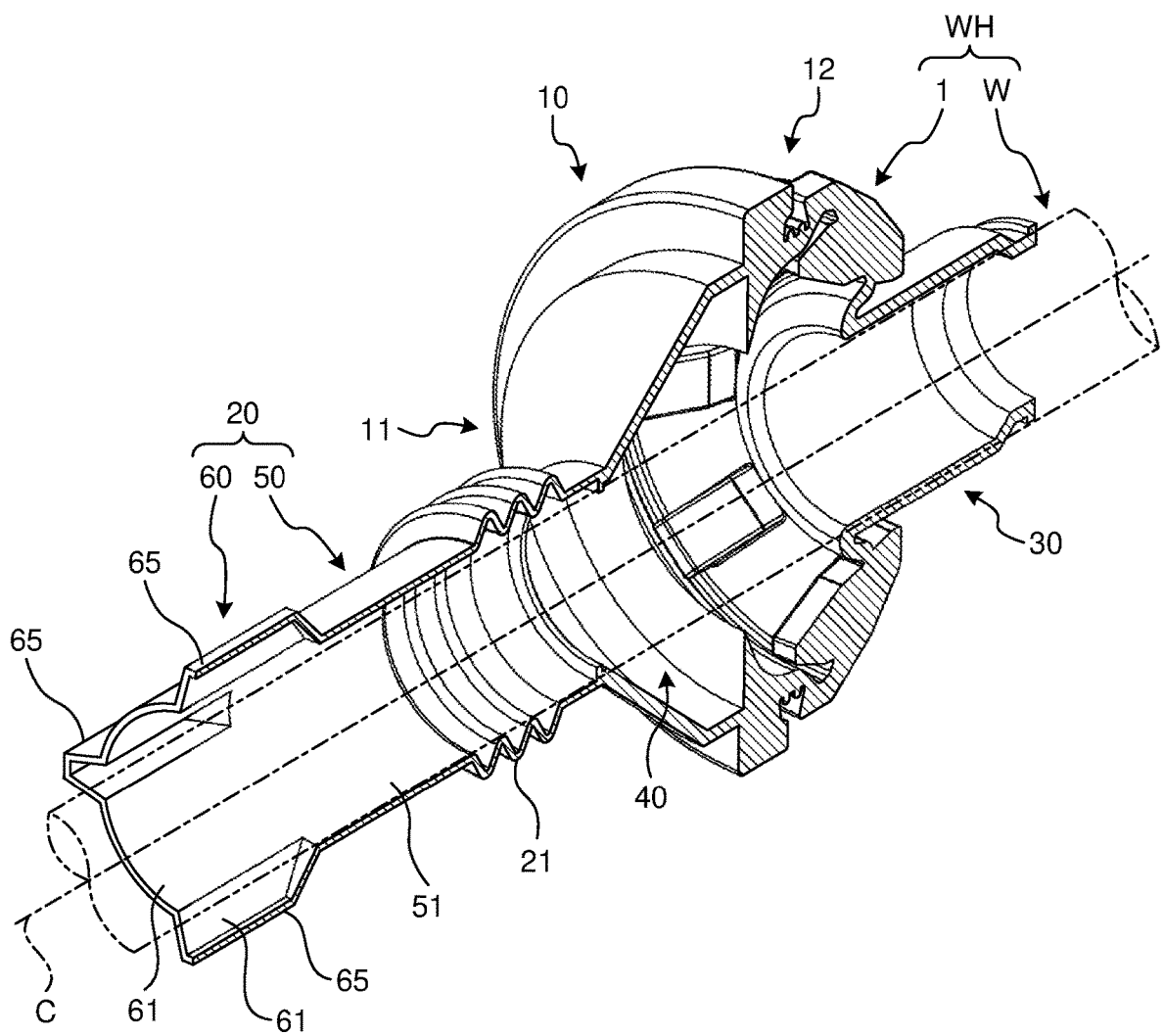
FIG. 7 is a cross-sectional perspective view illustrating the schematic structure of the wire harness in which the grommet according to the second embodiment is used.

FIG. 6 is a perspective view of the grommet 1 according to the second embodiment, and FIG. 7 is a cross-sectional view of the grommet 1 illustrated in FIG. 6. The grommet 1 according to the second embodiment includes the main body part 10 and the tubular part 20, and the tubular part 20 includes the tubular part main body 50 and the fold-back part 60, which is similar to the structure of the grommet 1 according to the first embodiment. In the structure of this embodiment, the fold-back part 60 includes the folding parts 65 that open to the circumferential direction at the attachment position and that are folded in the circumferential direction at the use position.

Specifically, in the second embodiment, the diameter of the inner surface 61 of the fold-back part 60 at the use position is substantially the same as that of the inner surface 51 of the tubular part main body 50. In the fold-back part 60 formed in this manner, the folding part 65 is formed so that a wall part forming the fold-back part 60 when the fold-back part 60 at the use position is viewed in the axial direction X has the shape that protrudes outward in the radial direction with the central axial line C as the center and is folded in the circumferential direction. The folding part 65 that protrudes to the radial direction in the fold-back part 60 at the use position is formed in the range where the fold-back part 60 is formed in the axial direction X. In other words, the folding part 65 is formed to have a hollow rib shape that is extended in the axial direction X. In the second embodiment, the folding parts 65 are formed at four positions on the fold-back part 60, and the four folding parts 65 are disposed at equal intervals in the circumferential direction with the central axial line C as the center.

The diameter of the inner surface 61 of the fold-back part 60 at the use position is substantially equal to the diameter of the inner surface 51 of the tubular part main body 50. However, since the fold-back part 60 includes the folding parts 65 as described above, the entire length of the inner surface 61 at the use position in the circumferential direction is longer by the folding parts 65. That is to say, the folding part 65 protrudes outward in the radial direction with the central axial line C as the center; therefore, the entire length of the inner surface 61 of the fold-back part 60 including the inner surfaces 61 of the folding parts 65 in the circumferential direction is longer than the circumferential length of the inner surface 61 of the fold-back part 60 in the case where the folding parts 65 are not provided. Accordingly, the entire length of the inner surface 61 of the fold-back part 60 at the use position in the circumferential direction is longer than the entire length of the inner surface 51 of the tubular part main body 50 in the circumferential direction.

Note that the number of folding parts 65 and the height thereof in the radial direction with the central axial line C as the center are preferably set on the basis of the diameter of the inner surface 61 when the fold-back part 60 is disposed at the attachment position, the thickness of the wall part of the fold-back part 60, and the like. In addition, the length of the folding part 65 in the axial direction X is preferably set on the basis of the length of the part of the tubular part 20 that is set as the fold-back part 60 in the axial direction X.

Figure 8:
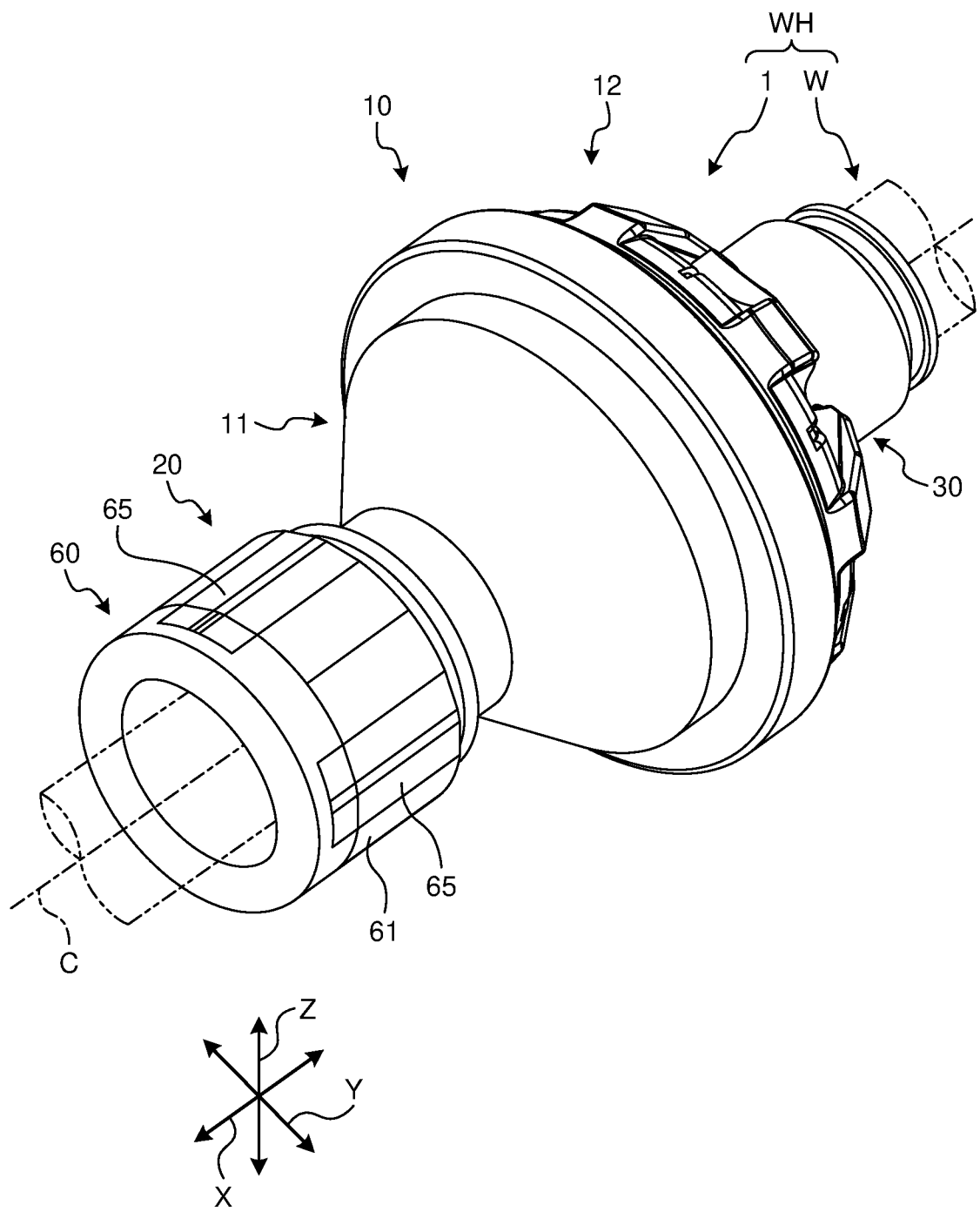
FIG. 8 is a perspective view illustrating a state in which a fold-back part of the grommet illustrated in FIG. 6 is folded back.
Figure 9:
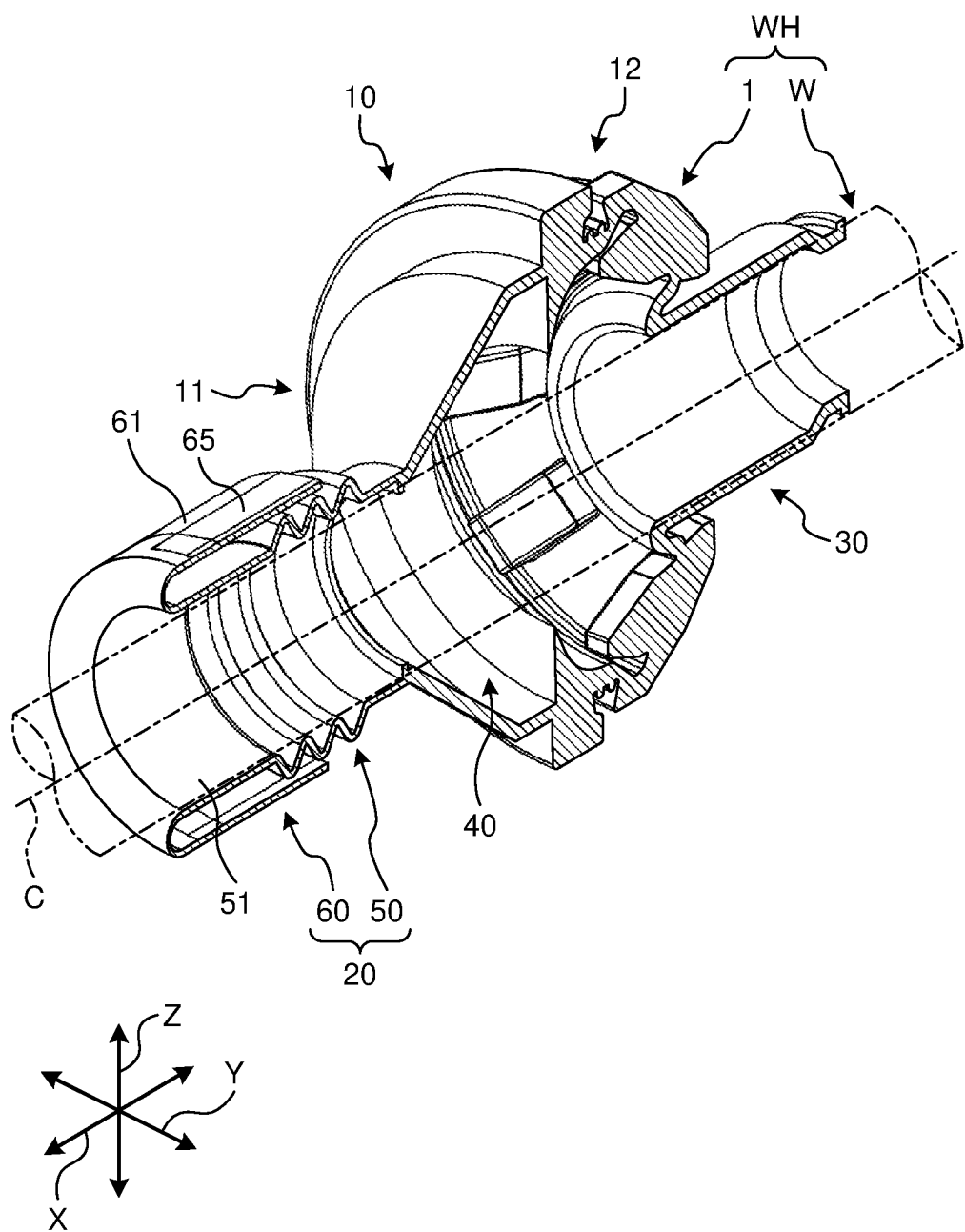
FIG. 9 is a cross-sectional view of the grommet illustrated in FIG. 8.

Also in the second embodiment, the wiring material W is inserted into the grommet 1, in the state in which the fold-back part 60 is folded back. FIG. 8 is a perspective view in which the fold-back part 60 of the grommet 1 illustrated in FIG. 6 is folded back. FIG. 9 is a cross-sectional view of the grommet 1 illustrated in FIG. 8. When the fold-back part 60 is folded back, the fold-back part 60 is folded back to the position of the tubular part main body 50 from the position close to the end of the folding part 65 near the main body part 10. Thus, the fold-back part 60 is folded back to the outside of the tubular part main body 50 in the radial direction with the central axial line C as the center in the state where the inner surface 61 serves as the outer surface, and is disposed at the attachment position. In this case, the folding part 65 provided to the fold-back part 60 is open to the circumferential direction with the central axial line C as the center at the attachment position. That is to say, when the fold-back part 60 is at the use position, the folding part 65 is formed in the folded shape in the circumferential direction with the central axial line C as the center; on the other hand, when the fold-back part 60 is at the attachment position, the folding part 65 that has been folded is open to the circumferential direction with the central axial line C as the center. Thus, at the attachment position, the fold-back part 60 can be positioned outside the tubular part main body 50 in the radial direction without causing the large tension in the circumferential direction with the central axial line C as the center.

Even at the attachment position, the large tension in the circumferential direction with the central axial line C as the center is not generated; therefore, the fold-back part 60 can be positioned outside the tubular part main body 50 in the radial direction without causing the contracting force in the radial direction. Therefore, the fold-back part 60 can easily cover the tubular part main body 50 from the outside in the radial direction and can be disposed outside the tubular part main body 50 easily. In the second embodiment, when the grommet 1 is molded in the producing process, the fold-back part 60 is molded in the state at the use position; in this point, the second embodiment is different from the first embodiment. In this structure, since the fold-back part 60 includes the folding parts 65, the fold-back part 60 can be folded back to the attachment position without causing the large contracting force.

When the wiring material W is inserted into the grommet 1, the wiring material W is inserted with the fold-back part 60 folded back to the attachment position; therefore, the wiring material W can be inserted with the entire length of the grommet 1 shortened in the axial direction X. Accordingly, the tool that is used when the wiring material W is inserted into the grommet 1 can be inserted easily into the insertion space part 40 and with the use of this tool, the size of the insertion space part 40 in the predetermined direction can be increased easily. The wiring material W is inserted into the insertion space part 40 after the size of the insertion space part 40 of the grommet 1 is increased by the tool.

After the wiring material W is inserted into the insertion space part 40 of the grommet 1, the fold-back part 60 that has been folded back to the attachment position is set to the use position (see FIG. 6 and FIG. 7). Thus, since the grommet 1 becomes long in the axial direction X, the wiring material W can be covered with the large length and the wiring material W can be covered with the grommet 1 more widely. After the wiring material W is covered with the grommet 1 at the use position, an adhesive tape is continuously wound around the fold-back part 60 from the outside of the tubular part 20 and the wiring material W. Thus, the tubular part 20 and the wiring material W are unified.

In the grommet 1 and the wire harness WH according to the second embodiment described above, the fold-back part 60 includes the folding parts 65 that are open to the circumferential direction at the attachment position and that are folded to the circumferential direction at the use position. Therefore, the entire length of the inner surface 61 of the fold-back part 60 in the circumferential direction can be made longer than the entire length of the inner surface 51 of the tubular part main body 50 in the circumferential direction more certainly. Thus, in the state at the attachment position where the fold-back part 60 is folded back toward the tubular part main body 50, the fold-back part 60 can be positioned outside the tubular part main body 50 in the radial direction without causing the contracting force in the radial direction more certainly. As a result, the water stopping performance can be enhanced while the deterioration in workability in assembling the grommet 1 is suppressed more certainly.

In addition, since the entire length of the inner surface 61 of the fold-back part 60 in the circumferential direction can be made longer than the entire length of the inner surface 51 of the tubular part main body 50 in the circumferential direction by the provision of the folding parts 65 to the fold-back part 60, the increase in outer diameter of the fold-back part 60 can be suppressed. Thus, the outer diameter of the tubular part 20 after the wiring material W is inserted can be reduced and the grommet 1 with the wiring material W inserted thereinto can be reduced in size.

In a reference example, the member that covers the wiring material W, such as a tube or a boot, may have a structure including the tubular part main body 50 and the fold-back part 60 as typified by the tubular part 20 in the grommet 1 according to the first and the second embodiments.

The grommet and the wire harness according to the embodiments of the present invention described above are not limited to the aforementioned embodiments and various changes are possible in the scope of claims.

The grommet and the wire harness according to the embodiments of the present invention may have a combination of the components described in the embodiments and modifications.

The grommet and the wire harness according to the present embodiments include the main body part and the tubular part. The tubular part includes the tubular part main body and the fold-back part. The fold-back part is foldable between the attachment position where the fold-back part is folded back to the outside of the tubular part main body and the use position where the fold-back part is positioned on the side opposite to the side where the main body part is positioned with respect to the tubular part main body. Thus, when the grommet and the wire harness are used, the fold-back part is set to the use position so that the tubular part can cover the wiring material in the state where the tubular part is long in the axial direction. Therefore, the water stopping performance can be enhanced. When the grommet is attached to the wiring material, the fold-back part is folded back so as to be brought to the attachment position. In this case, since the length of the tubular part is short in the axial direction, the grommet can be easily attached. As a result, the water stopping performance can be enhanced while the deterioration in workability in assembling the grommet is suppressed, which is advantageous.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A grommet comprising:
   a main body part that is fitted to a penetration hole penetrating an attachment target along an axial direction, stops water at the penetration hole, and has a wiring material inserted thereinto along the axial direction; and
   a tubular part that is unified with the main body part so as to have a tubular shape, and has the wiring material inserted thereinto along the axial direction, wherein
   the tubular part includes:
      a tubular part main body that is formed continuing from the main body part; and
      a fold-back part that is formed continuing from the tubular part main body on a side opposite to a side where the main body part is positioned in the axial direction,
   the fold-back part is foldable between an attachment position where the fold-back part is folded back to outside of the tubular part main body, and a use position where the fold-back part is positioned on the side opposite to the side where the main body part is positioned with respect to the tubular part main body,
   at the use position, a diameter of the inner surface of the fold-back part is larger than a diameter of the inner surface of the tubular part main body measured at a portion of the tubular part main body that is adjacent to the main body part and a step part is provided between the fold-back part and the tubular part main body, and
   the diameter of the inner surface of the step part continuously decreases along the axial direction from the diameter of the inner surface of the fold-back part to the diameter of inner surface of the tubular part main body that is adjacent to the main body part.

2. The grommet according to claim 1, wherein
   at the use position, an entire length of an inner surface of the fold-back part in a circumferential direction is longer than an entire length of an inner surface of the tubular part main body in the circumferential direction, and in a state where the foldback part is folded back toward the tubular part main body, the fold-back part is disposed outside the tubular part main body in a radial direction without causing a contracting force in the radial direction.

3. A grommet comprising:
   a main body part that is fitted to a penetration hole penetrating an attachment target along an axial direction, stops water at the penetration hole, and has a wiring material inserted thereinto along the axial direction; and
   a tubular part that is unified with the main body part so as to have a tubular shape, and has the wiring material inserted thereinto along the axial direction, wherein
   the tubular part includes:
      a tubular part main body that is formed continuing from the main body part; and
      a fold-back part that is formed continuing from the tubular part main body on a side opposite to a side where the main body part is positioned in the axial direction,
   the fold-back part is foldable between an attachment position where the fold-back part is folded back to outside of the tubular part main body, and a use position where the fold-back part is positioned on the side opposite to the side where the main body part is positioned with respect to the tubular part main body,
   the fold-back part includes a folding part that opens to the circumferential direction at the attachment position and that is folded to the circumferential direction at the use position,
   the folding part is formed so that a wall part forming the fold-back part when the fold-back part at the use position is viewed in the axial direction has the shape that protrudes outward in the radial direction with the central axial line as the center and is folded in the circumferential direction, when the fold-back part is at the attachment position, the folding part that has been folded is open to the circumferential direction with the central axial line as the center.

4. A wire harness comprising:
   a wiring material having conductivity; and
   a grommet provided to the wiring material, wherein
   the grommet includes:
      a main body part that is fitted to a penetration hole penetrating an attachment target along an axial direction, stops water at the penetration hole, and has the wiring material inserted thereinto along the axial direction; and
      a tubular part that is unified with the main body part so as to have a tubular shape, and has the wiring material inserted thereinto along the axial direction,
      the tubular part includes:
         a tubular part main body that is formed continuing from the main body part; and
         a fold-back part that is formed continuing from the tubular part main body on a side opposite to a side where the main body part is positioned in the axial direction,
      the fold-back part is foldable between an attachment position where the fold-back part is folded back to outside of the tubular part main body, and a use position where the fold-back part is positioned on the side opposite to the side where the main body part is positioned with respect to the tubular part main body,
      at the use position, a diameter of the inner surface of the fold-back part is larger than a diameter of the inner surface of the tubular part main body measured at a portion of the tubular part main body that is adjacent to the main body part and a step part is provided between the fold-back part and the tubular part main body, and
      the diameter of the inner surface of the step part continuously decreases along the axial direction from the diameter of the inner surface of the fold-back part to the diameter of inner surface of the tubular part main body that is adjacent to the main body part.

* * * * *